United States Patent [19]
Johnson

[11] Patent Number: 5,567,024
[45] Date of Patent: Oct. 22, 1996

[54] METHOD AND SYSTEM FOR DAMPING WHEEL SPEED OSCILLATION ON VEHICLES HAVING ANTI-LOCK BRAKE SYSTEMS

[75] Inventor: Bernard W. Johnson, Brighton, Mich.

[73] Assignee: Kelsey-Hayes Company, Romulus, Mich.

[21] Appl. No.: 354,514

[22] Filed: Dec. 13, 1994

[51] Int. Cl.$^6$ .................................................. B60T 8/74
[52] U.S. Cl. .......................... 303/158; 303/163; 303/164; 303/185
[58] Field of Search .................................. 303/157, 158, 303/185, 155, 156, 159, 163, 164, 194; 364/426.01

[56] References Cited

U.S. PATENT DOCUMENTS 3,637,264  1/1972  Leiber et al. ............................ 303/185

FOREIGN PATENT DOCUMENTS 57-18546  1/1982  Japan ................................... 303/158
61-71263  4/1986  Japan ................................... 303/158

Primary Examiner—Robert J. Oberleitner
Assistant Examiner—Peter M. Poon
Attorney, Agent, or Firm—MacMillan, Sobanski & Todd

[57] ABSTRACT

A method and system for damping wheel speed oscillation during an anti-lock braking event. The method includes the initial step of sensing the wheel speed and determining a wheel slip based on the sensed wheel speed and a vehicle speed reference. Next, the method continues with the step of determining whether the wheel slip has exceeded a predetermined slip threshold. If the wheel slip has not exceeded a predetermined slip threshold, the method performs normal or unmodified anti-lock brake control. If the wheel slip has exceeded the predetermined slip threshold, the method continues with the step of determining whether an acceleration feedback condition representative of a high mu surface has been satisfied. If an acceleration feedback condition has been satisfied, the method continues with the step of increasing brake pressure applied to the wheel from a steady-state level in a step-wise function during acceleration of the wheel before the wheel speed reaches the vehicle speed reference. The brake pressure is applied as a function of the wheel acceleration. If an acceleration feedback condition has not been satisfied, the method applies normal anti-lock brake control.

13 Claims, 4 Drawing Sheets

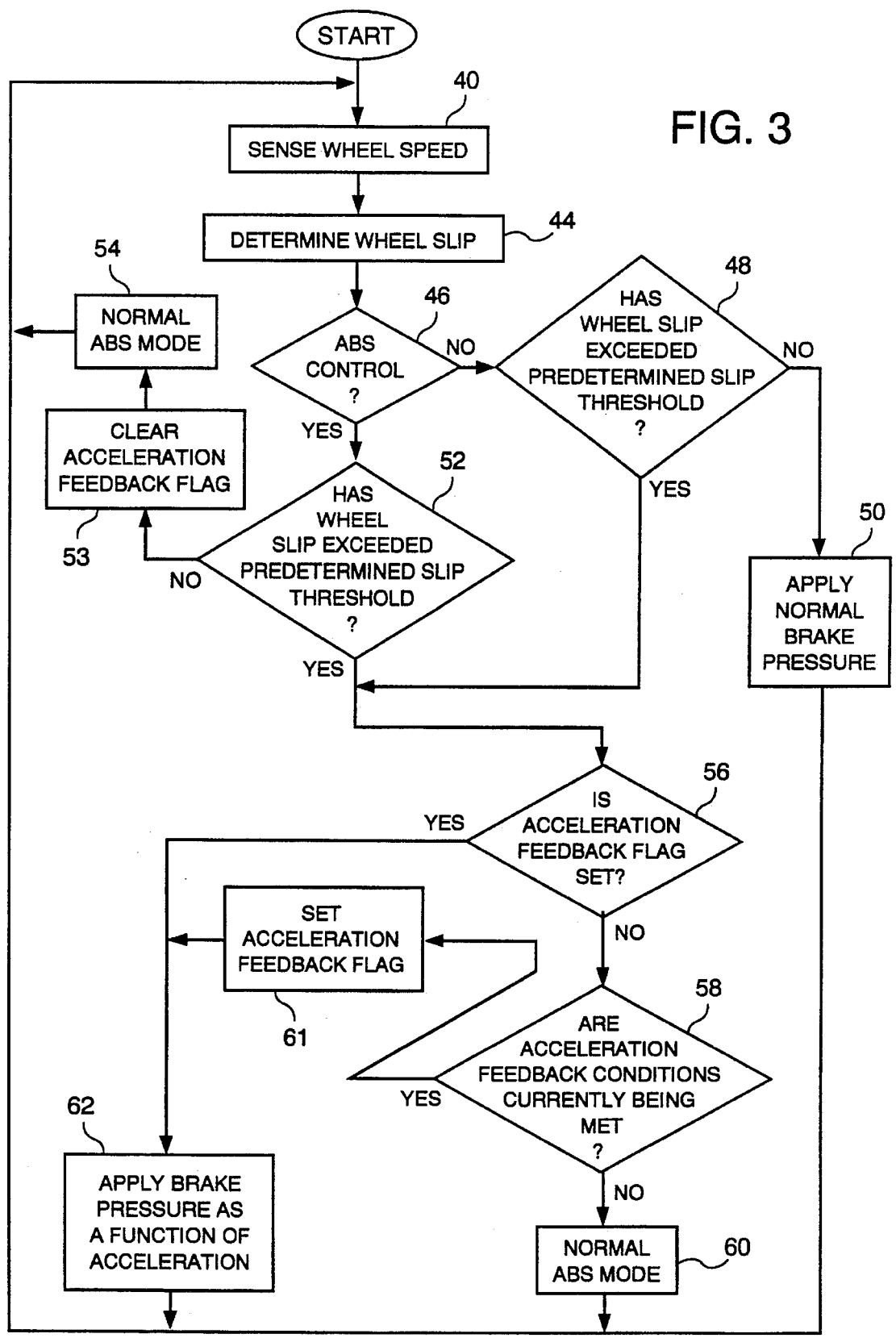

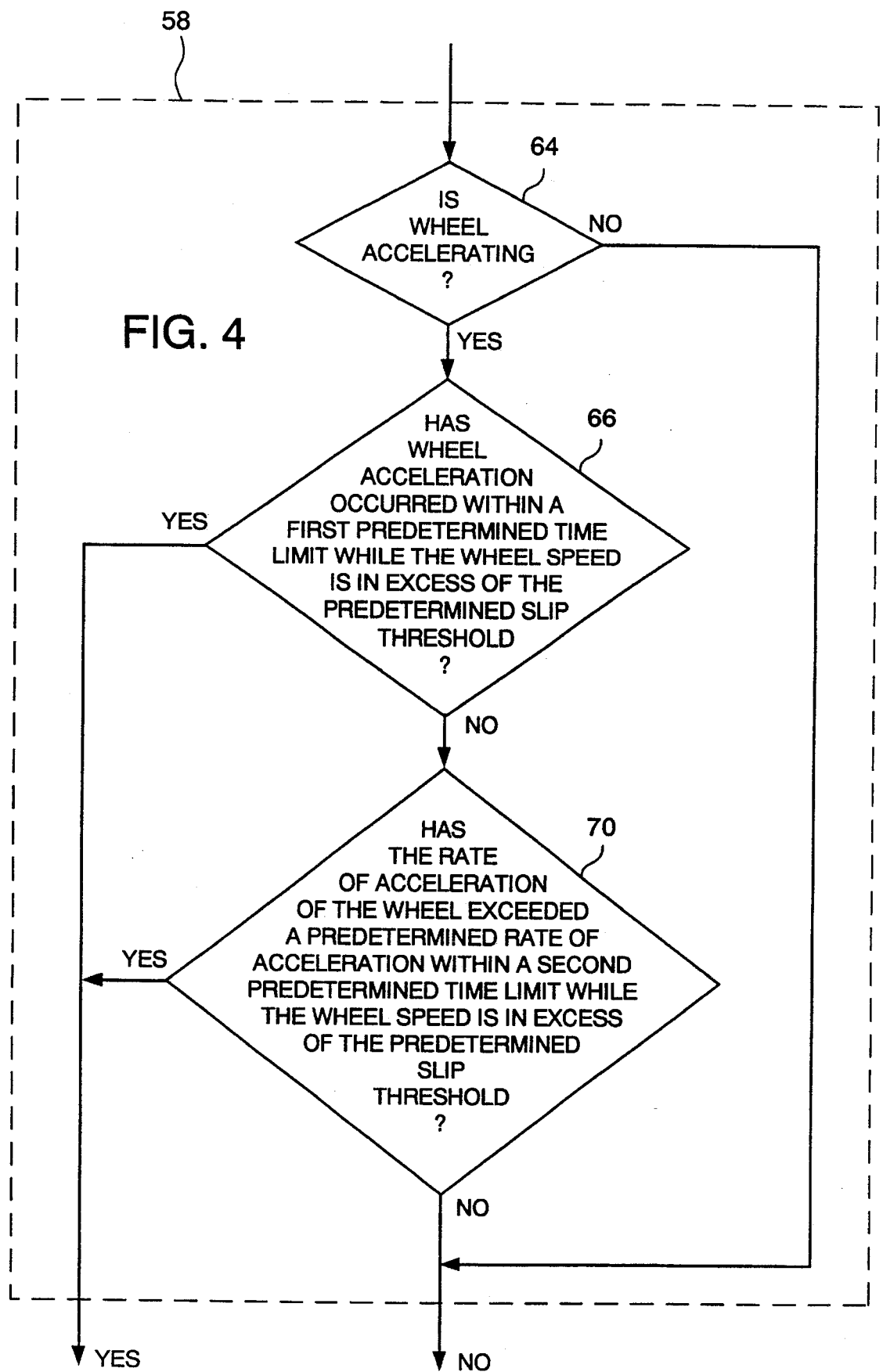

METHOD AND SYSTEM FOR DAMPING WHEEL SPEED OSCILLATION ON VEHICLES HAVING ANTI-LOCK BRAKE SYSTEMS

TECHNICAL FIELD

This invention relates to anti-lock brake systems. In particular, this invention relates to a method and system for damping wheel speed oscillation on vehicles having anti-lock brake systems.

BACKGROUND ART

In an effort to protect vehicle operators and occupants, vehicle manufacturers and their suppliers are increasingly designing and manufacturing vehicles with additional and improved safety features. One such safety feature that has been incorporated into a number of vehicle types is anti-lock braking, which can take a variety of forms.

Ideally, the braking forces at the wheels increase proportionately as the driver increases the force on the brake pedal. Unfortunately, this is not always the case in braking procedures. As the braking torque and hence the braking force at the wheel is increased, the rotational speed of the braked wheels becomes less than the speed of the vehicle. When the rotational speed of a wheel is less than the vehicle speed, "slippage" is said to occur between the tire and the surface. With further increase in brake pressure, the slippage between the tire and the surface increases until lockup and skidding of the wheel occurs. In most cases, lockup causes a reduction in braking force and an increase in stopping distance. Lockup also causes a degradation in directional control due to a reduction in the lateral forces at the wheels.

Both of these problems associated with lockup were addressed with anti-lock brake systems (ABS). A basic ABS monitors the velocity at each of the wheels, decides whether the wheel is excessively slipping based on these velocity measurements, and modulates the braking pressure accordingly to avoid lockup. The ABS aids in retaining vehicle stability and steerability while providing shorter stopping distances.

One method by which a state of excessive slippage is identified in the ABS involves comparing the speed of each wheel to a reference speed to determine if a slip threshold has been exceeded. The reference speed is an estimate of the true vehicle speed based on current and previous values of the individual wheel speeds. The slip threshold is a predetermined departure of wheel speed from a preselected speed. If the speed of a wheel is significantly less than the reference speed, or exceeds the slip threshold, then the wheel is deemed by the ABS to be excessively slipping. The ABS then reduces the pressure actuating the brake in order to reduce brake torque. The reduction of brake torque allows the friction force at the surface to accelerate the wheel, thereby causing a reduction of the slip in the wheel.

After a period of constant braking pressure following the pressure reduction, the pressure actuating the brake is increased until excessive wheel slip occurs again. The cycle of decreasing the brake pressure, maintaining constant brake pressure, and then increasing brake pressure is repeated until the anti-lock event ends. The parameters which define the specifics of this cycle depend on the operating conditions.

If a wheel has significant acceleration when recovering from a departure, the wheel speed will likely overshoot the vehicle speed reference and oscillate for a period of time. Therefore, the need exists within an anti-lock brake system for damping wheel speed oscillation in order to maintain good control of the wheel.

DISCLOSURE OF THE INVENTION

It is thus a general object of the present invention to provide a method and system for suppressing the oscillation of wheel speed during an anti-lock brake system event.

A further object of the present invention is to provide a method and system for detecting the potential for wheel speed oscillation during an anti-lock brake system event.

In carrying out the above objects and other objects, features and advantages of the present invention, a method is provided for damping wheel speed oscillation during an anti-lock braking event.

The method includes the initial step of sensing the wheel speed. Next, a wheel slip is determined based on the difference between the sensed wheel speed and a vehicle speed reference.

In keeping with the invention, the method continues with the step of determining whether the wheel slip is in excess of a predetermined slip threshold. If the wheel slip has not exceeded the predetermined slip threshold, the method performs normal or unmodified anti-lock brake control.

However, if the wheel slip has exceeded the predetermined slip threshold, the method continues with the step of increasing brake pressure applied to the wheel in a step-wise fashion during acceleration of the wheel before the wheel speed reaches the vehicle speed reference. The early application of brake pressure to the wheel provides damping of any wheel speed oscillation.

The early application of the brake pressure to the wheel is performed if at least one of two acceleration feedback conditions have been met. A first acceleration feedback condition is met if, while the wheel speed is in excess of the predetermined slip threshold, the wheel is accelerating and the acceleration of the wheel speed has occurred within a first predetermined time limit. The first predetermined time limit is 50 ms.

The second acceleration feedback condition is satisfied if, while the wheel speed is in excess of the predetermined slip threshold, the wheel is accelerating and the wheel rate of acceleration has exceeded a predetermined rate of acceleration within a second predetermined time limit. The second predetermined time limit is 150 ms, and the predetermined rate of acceleration is 5 g's.

In further carrying out the above objects and other objects, features and advantages of the present invention, a system is also provided for carrying out the steps of the above described method.

The system includes a sensor for sensing the wheel speed. The system further includes a control unit for determining the wheel slip, and for determining whether the wheel slip has exceeded a predetermined slip threshold.

Still further, the system includes a brake control valve, responsive to the control unit, for increasing brake pressure applied to the wheel in a step-wise fashion during acceleration of the wheel before the wheel speed reaches the vehicle speed reference.

Furthermore, the control unit of the system also determines if at least one of two acceleration feedback conditions have been met before applying brake pressure to the wheel while the wheel is accelerating.

The above objects, features and advantages of the present invention, as well as others, are readily apparent from the following detailed description of the best mode for carrying out the invention when taken in connection with the accompanying drawings.

BRIEF DESCRIPTION OF THE DRAWINGS

A more complete appreciation of the invention and many of the attendant advantages thereof may be readily obtained by reference to the following detailed description when considered with the accompanying drawings in which reference characters indicate corresponding parts in all of the views, wherein:

FIG. 3 is a flowchart illustrating the general sequence of steps associated with the operation of the present invention; and FIG. 4 is a flowchart illustrating the conditions required to invoke the operation of the present invention.

BEST MODE FOR CARRYING OUT THE INVENTION

Figure 1:
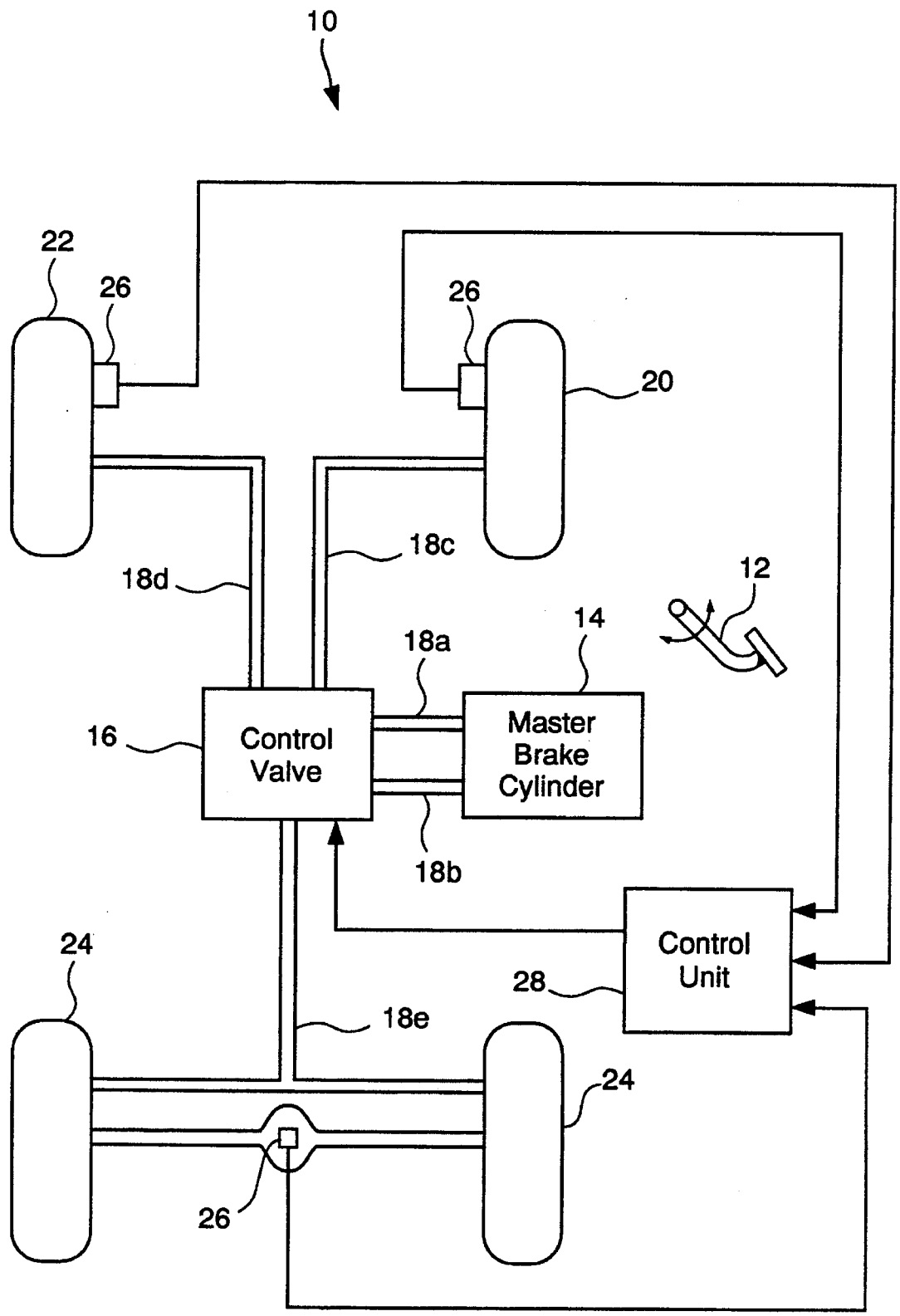
FIG. 1 is a block diagram of the preferred embodiment of the present invention.

Turning now to the drawings, FIG. 1 is a block diagram of a preferred embodiment of the present invention. An anti-lock brake (ABS) system 10 includes a brake pedal 12, a master brake cylinder 14, a control valve 16, brake fluid conduits 18a, 18b, 18c, 18d and 18e, front wheels 20, 22 and a pair of rear wheels 24.

The ABS system 10 includes three vehicle wheel speed sensors 26 which function to measure the velocity of each of the front wheels 20, 22 and the rear wheels 4. The ABS system 10 also includes an ABS electronic control unit (ECU) 28. Each of the wheel sensors 26 are in electrical communication with the ECU 28. As is well known in the art, each of the wheel speed sensors 26 may comprise a stationary variable reluctance sensor positioned adjacent a toothed wheel which rotates with its respective vehicle wheel. The variable reluctance sensors each generate a pulsed signal whose frequency varies directly with the speed of the wheels. Each of these signals is communicated to the ECU 28 by the wheel sensors 26.

The ECU 28 is in electrical communication with the ABS control valve 16. The ECU 28 includes electronic componentry, including a commercially available microprocessor, and executes software, permitting the ECU 28 to control the ABS.

In general, the ECU 28 operates to determine both local and global control objectives, to activate the apply or dump valves, to control pressure or to hold pressure at its current level. For example, the ECU 28 functions as control means for determining the speed of the vehicle, determining a slip threshold, determining a departure depth, and for comparing the departure depth to the slip threshold and actuating the control valve 16 when the departure depth exceeds the slip threshold. This action isolates the individual vehicle wheel brakes in the hydraulic brake circuit from the master cylinder 14, thereby halting any increase in brake fluid pressure in the vehicle wheel brakes and preventing incipient vehicle wheel lock.

To activate the anti-lock brake system 10, the ECU 28 is operatively connected to the ABS control valve 16, which provides for regulation of the brake fluid pressure from the master brake cylinder 14 to the individual brakes of each of the wheels 20, 22, 24 via the brake fluid conduits 18a, 18b, 18c, 18d and 18e.

Figure 2A:
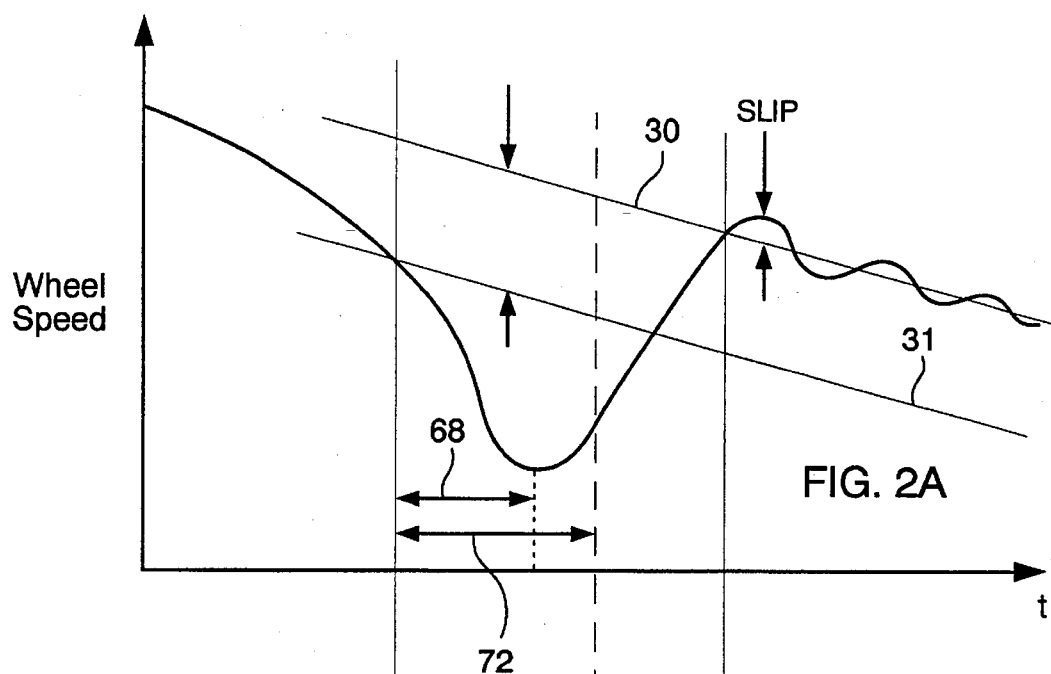
FIGS. 2A–2C illustrate the brake pressure cycling during an anti-lock brake system event.
Figure 2B:
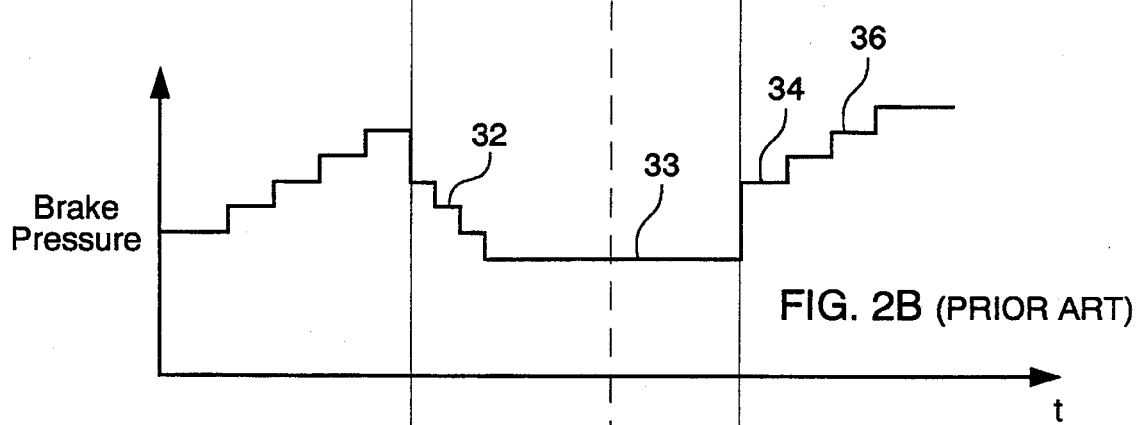
Figure 2C:
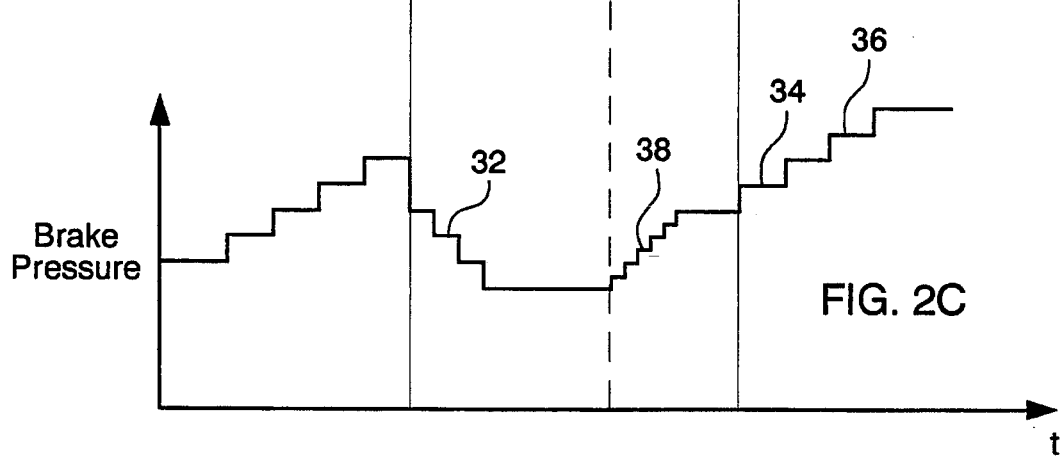

FIGS. 2A–2C present typical profiles for the wheel speed and the brake pressure during a portion of an ABS controlled stop. After the wheel speed departs from the vehicle speed reference 30 in excess of a predetermined slip threshold 31, indicating an imminent lockup condition or "slip", the brake pressure is reduced by several dump pulses 32. At this point in time, the wheel speed is decelerating away from the vehicle speed and continues decelerating until the wheel begins to recover and accelerates towards the vehicle speed.

FIG. 2B represents the prior art method of maintaining and applying brake pressure. During the deceleration and acceleration of the wheel speed, the brake pressure is held at a steady-state level 33. Once the wheel recovers, the brake pressure is reapplied with a primary pulse 34 followed by several secondary apply pulses 36.

However, if the wheel speed is accelerating high enough, the wheel speed will likely overshoot the vehicle speed and oscillate for a period of time during recovery, as illustrated in FIG. 2A. If a small amount of brake pressure 38 is applied during the acceleration period to reduce the wheel speed overshoot as shown in FIG. 2C, the wheel speed oscillation can be suppressed or damped.

A flowchart illustrating the sequence of steps taken by the programmed ECU 28 is illustrated in FIG. 3. The method of the present invention begins with the step of sensing the wheel speed as shown by block 40. The speed of each of the front wheels 20, 22 and the rear wheels 24 are sensed to determine if any of the wheels require the method of the present invention.

The method continues with the step of determining a wheel slip as shown by block 44. Wheel slip is determined by calculating the difference between the sensed wheel speed and the vehicle speed reference.

The method continues with the step of determining whether ABS control is activated, as shown by block 46. ABS is activated if wheel instability is present. If instability is not present when brake pressure is applied to the wheel, the method proceeds to determine whether the wheel slip has exceeded the predetermined slip threshold as shown by block 48. The slip threshold 31, as illustrated in FIG. 2A, is determined in order to provide indication of slippage. This threshold defines the maximum departure allowed between the wheel speed and the vehicle speed reference before the present invention is activated in order to apply brake pressure early to suppress wheel speed oscillation.

If the wheel slip has not exceeded the predetermined slip threshold, normal brake pressure is applied to the wheel, as shown by block 50. If the wheel slip has exceeded the predetermined threshold, the method continues as if the ABS was activated.

If instability is present, ABS is activated, and the method again determines whether the wheel slip has exceeded the predetermined slip threshold, as shown by block 52. If the wheel slip does not exceed the predetermined slip threshold, an acceleration feedback flag is cleared as shown by block 53 and normal or unmodified anti-lock brake pressure is applied to the wheels as shown by block 54. This normal anti-lock brake pressure control was described above in conjunction with FIG. 2B.

The acceleration feedback flag is a parameter used to invoke the method of the present invention. The flag is set if acceleration feedback conditions have been met. The acceleration feedback conditions are wheel conditions indicative of higher mu surfaces, or rapid wheel "turn around," which, in turn, will cause the wheel speed to oscillate.

If the wheel slip exceeds the predetermined slip threshold, the method continues to determine whether the acceleration feedback flag is set as shown by block 56. This flag cannot be set until the method of the present invention has been traversed at least once.

Therefore, in the first run through the method of the present invention, the acceleration feedback flag is not set. The method then continues with the step of determining whether the acceleration feedback conditions are currently being met, as shown by block 58. There are two acceleration feedback conditions that are indicative of wheel speed oscillation, and they will be discussed below in conjunction with FIG. 4.

If the acceleration feedback conditions are not currently being met, normal or unmodified ABS is applied to the brakes as shown by block 60.

On the other hand, if the acceleration feedback conditions are currently being met, the acceleration feedback flag is set, as shown by block 61, and brake pressure is applied to the wheel as a function of wheel speed acceleration as shown by block 62.

The brake pressure is applied utilizing pulse width modulation. The size of the pulse is determined by the following:

pulse width=−DEC×[GAIN×TRIM×GAINL]

where −DEC (minus wheel deceleration) is a positive number representing the amount of wheel acceleration. The net gain (or GAIN×TRIM×GAINL) is an experimentally determined amount derived to ensure a nominal brake pressure response according to an estimated operating brake pressure.

The brake pressure is pulsed as a function of the rate of wheel speed acceleration. For example, if the wheel speed acceleration is large or the departure is small, the GAINL term, and thereby the pulse size, is increased. On the other hand, if the acceleration is small or the departure is deep, the pulse size is smaller.

First departures can vary quite a bit no matter what type of surface the vehicle is on. Therefore, it is prudent to be cautious with the early brake pressure pulses until more is known about the surface to avoid possible bang-bang control. If the departure is the first departure of an ABS stop, the pulse size is cut in half. The same can be said for a deep departure. A deep departure can indicate a lower mu, and it is suggested to be more cautious with early brake pressure pulses.

On any departure, if the predetermined slip threshold has been exceeded by 25 percent, the pulse is also cut in half. Also, if wheel jerk is at a predetermined negative value, indicating concavity in the direction of greater slip over time, the pulse is cut in half in order to ensure that the early brake pressure pulse is not large enough to cause the wheel to immediately go into another departure.

Referring now to FIG. 4, the acceleration feedback conditions necessary to invoke the method of the present invention are discussed. First, the wheel must be accelerating as shown by block 64. If the wheel is not accelerating, the method proceeds to step 60, and normal ABS is applied to the brakes.

If the wheel is accelerating, the method continues with the step of determining whether the wheel acceleration has begun within a first predetermined time limit while the wheel speed is in excess of the predetermined slip threshold, as shown by block 66. The first predetermined time limit 68, as illustrated in FIG. 2A, for the preferred embodiment is set for 50 If the wheel speed has begun acceleration within 50 msec prior to the wheel accelerating towards the vehicle speed reference, the methods proceed to step 62 as discussed above.

If the wheel speed has not begun acceleration within the first predetermined time limit, the method continues with the step of determining whether the rate of acceleration of the wheel has exceeded a predetermined rate of acceleration within a second predetermined time limit, as shown by block 70. The second predetermined time limit 72, as illustrated in FIG. 2A, for the preferred embodiment is set for 150 msec. The predetermined amount of acceleration for the preferred embodiment is 5 g's.

If the rate of acceleration of the wheel has not exceeded the predetermined rate of acceleration within the second predetermined time limit while the wheel speed is in excess of the predetermined slip threshold, then normal or unmodified anti-lock brake pressure is applied to the wheels as shown by block 60.

If the rate of acceleration of the wheel has exceeded the predetermined rate of acceleration within the second predetermined time limit while the wheel speed is in excess of the predetermined slip threshold, then brake pressure is applied as a function of wheel speed acceleration as shown by block 62.

Once the acceleration feedback conditions are met and the acceleration feedback flag is set, brake pressure is applied to the wheel as a function of acceleration until the wheel slip no longer exceeds the predetermined slip threshold. At this time, the brake pressure is reapplied with the primary apply pulse, reduced to account for the early apply pulses, followed by several secondary apply pulses. The ABS cycle repeats each time a wheel departure is found.

While the best modes for carrying out the invention have been described in detail, those familiar with the art to which this invention relates will recognize various alternative designs and embodiments for practicing the invention as defined by the following claims.

What is claimed is:

1. For use with a vehicle having a plurality of wheels each having a brake, and an anti-lock braking system having an electronic control unit capable of cyclic control of brake pressure to the brake, a method of damping wheel speed oscillation of any one of the wheels during an anti-lock brake system event wherein brake pressure is decreased as the wheel speed decelerates from a vehicle speed and brake pressure is maintained at a steady-state level until the wheel speed accelerates to the vehicle speed, the method comprising:

sensing a speed of the one wheel;

determining a wheel slip based on the sensed wheel speed and a vehicle speed reference;

determining whether the wheel slip has exceeded a predetermined slip threshold representing a pre-lock-up condition;

determining whether the wheel is accelerating;

while the wheel slip has exceeded the predetermined slip threshold, determining whether the acceleration of the wheel speed has begun within a first predetermined time limit if the wheel is accelerating; and in response to the acceleration of the wheel speed beginning within the first predetermined time limit, increasing brake pressure applied to the wheel from the steady-state level in a step-wise fashion during acceleration of the wheel before the wheel speed reaches the vehicle speed reference.

2. The method of claim 1 wherein the step of determining the wheel slip includes determining the difference between the sensed wheel speed and the vehicle speed reference.

3. The method of claim 1 wherein the step of increasing the brake pressure applied to the wheel is performed based on an acceleration of the wheel.

4. The method of claim 1 wherein the first predetermined time limit is 50 msec.

5. The method of claim 1 wherein the method further comprises the steps of:

determining whether the wheel is accelerating; and while the wheel slip has exceeded the predetermined slip threshold, determining whether a rate of acceleration of the wheel has exceeded a predetermined rate of acceleration within a second predetermined time limit if the wheel is accelerating.

6. The method of claim 5 wherein the second predetermined time limit is 150 msec.

7. The method of claim 5 wherein the predetermined rate of acceleration is 5 g's.

8. For use with a vehicle having a plurality of wheels each having a brake, and an anti-lock braking system having an electronic control unit capable of cyclic control of brake pressure to the brake, a system for damping wheel speed oscillation of any one of the wheels during an anti-lock brake system event wherein brake pressure is decreased as the wheel speed decelerates from the vehicle speed and brake pressure is maintained at a steady-state level until the wheel speed accelerates to the vehicle speed, the system comprising:

a sensor for sensing a speed of the one wheel;

a control unit for performing the following:

determining a wheel slip based on the sensed wheel speed and a vehicle speed reference;

determining whether the wheel slip has exceeded a predetermined slip threshold representing a pre-lockup condition;

determining whether the wheel is accelerating;

while the wheel slip has exceeded the predetermined slip threshold, determining whether the acceleration of the wheel speed has begun within a first predetermined time limit if the wheel is accelerating; and a brake control valve, responsive to the control unit, for increasing brake pressure applied to the wheel from the steady-state level in a step-wise fashion during acceleration of the wheel before the wheel speed reaches the vehicle speed reference if the acceleration of the wheel speed has begun within the first predetermined time limit.

9. The system of claim 8 wherein the brake pressure is applied to the wheel based on an acceleration of the wheel.

10. The system of claim 8 wherein the control unit further for performing the following:

determining whether the wheel is accelerating; and while the wheel slip has exceeded the predetermined slip threshold, determining whether a rate of acceleration of the wheel has exceeded a predetermined rate of acceleration within a second predetermined time limit if the wheel is accelerating.

11. The system as recited in claim 10 wherein the second predetermined time limit is 150 msec.

12. The system as recited in claim 10 wherein the rate of acceleration is 5 g's.

13. The system as recited in claim 8 wherein the first predetermined time limit is 50 msec.

* * * * *